UNITED STATES PATENT OFFICE.

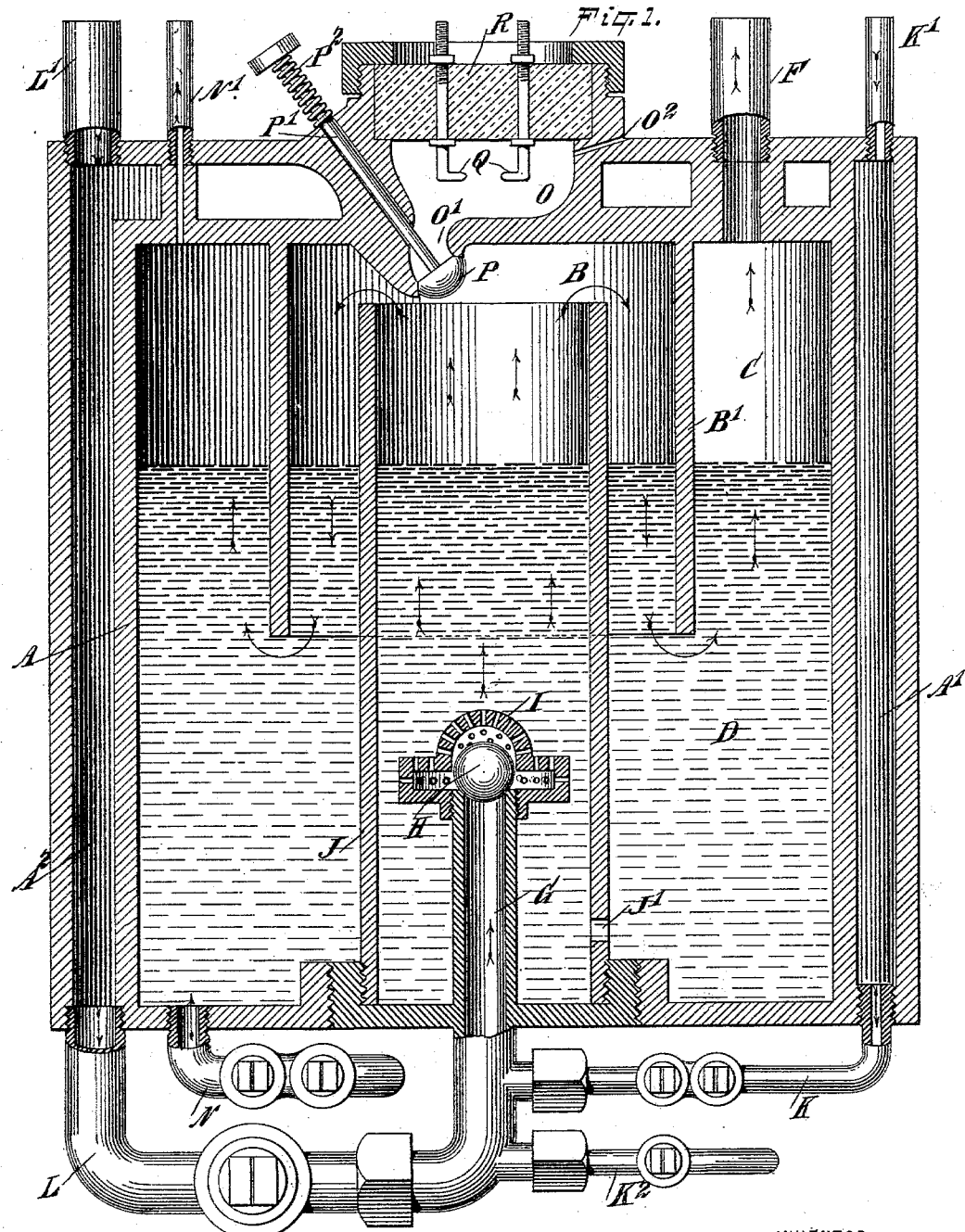

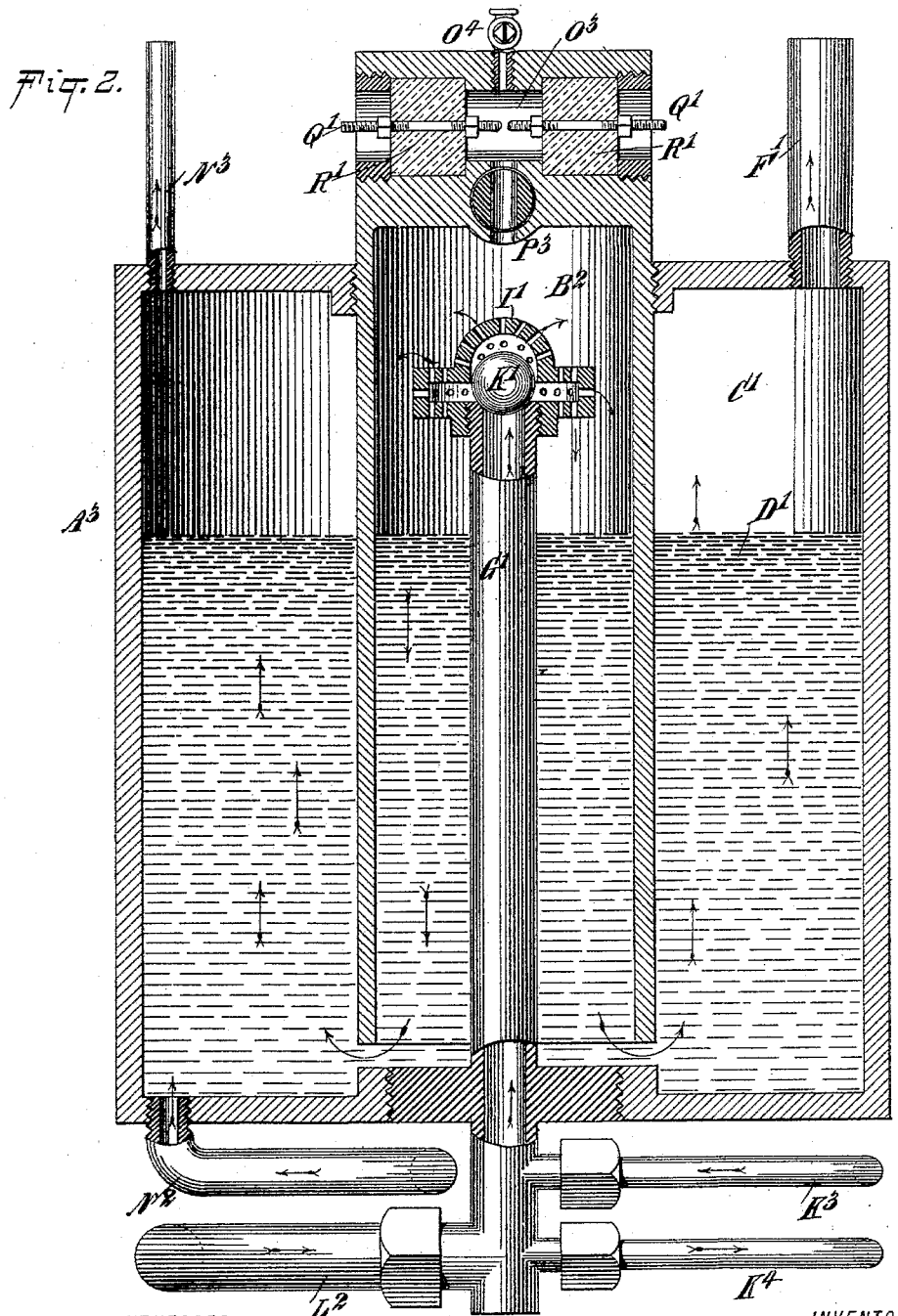

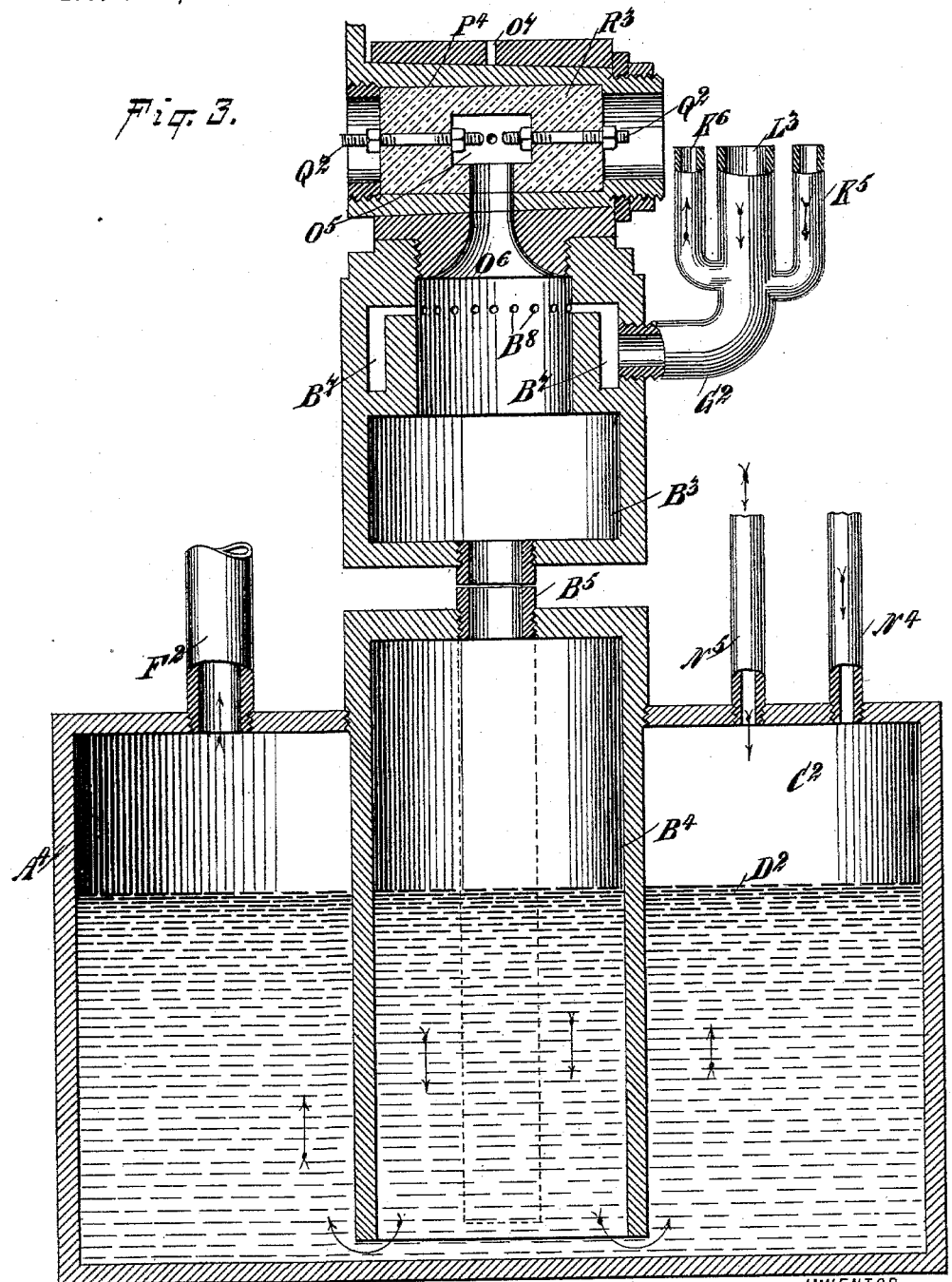

JOHN McINTYRE, OF JERSEY CITY, NEW JERSEY.

APPARATUS FOR INCREASING EFFICIENCY OF COMPRESSED AIR.

SPECIFICATION forming part of Letters Patent No. 596,822, dated January 4, 1898.

Application filed December 30, 1895. Serial No. 573,777. (No model.)

*To all whom it may concern:*

Be it known that I, JOHN MCINTYRE, of Jersey City, in the county of Hudson and State of New Jersey, have invented a new and Improved Apparatus for Increasing the Efficiency of Compressed Air, of which the following is a full, clear, and exact description.

The object of the invention is to provide a new and improved apparatus for treating compressed air to increase its efficiency in a very simple and economical manner and to render it more efficient and serviceable for work as a motive agent in a compressed-air motor.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improved apparatus, and Figs. 2 and 3 are similar views of modified forms of the same.

In apparatus for heating compressed air as heretofore practiced the compressed air preparatory to its entering the motor is passed through water heated by external means. It has been found that this method for heating the water is rather expensive in comparison to the results obtained, and the apparatus used for the purpose was of a cumbersome complex construction, and hence not well adapted and impracticable for compressed-air motors employed for propelling street-cars and for other purposes where space is very limited. Now with my apparatus, presently to be described in detail, I am enabled to increase the efficiency of the compressed air to a considerable extent at a comparatively low cost and can simplify the apparatus to render it very serviceable and practicable for the intended work.

The apparatus shown in Fig. 1 is provided with a suitably-constructed casing A, in the top of which is a combustion-chamber B and a vapor-chamber C, separated one from the other by a condensing liquid D, the level of which defines the bottoms of said chambers. The combustion-chamber is sealed by the liquid D, preferably water, and a combustible gas is burned in this closed chamber above and in the presence of, on, and above the liquid, the latter being free to rise and fall in the said chamber B, according to the pressure therein. The efficient fluid, which forms the motive agent for the motor, generated and passing into the vapor-chamber, is passed for consumption by a pipe F to the engine or other motor to be driven. The liquid fuel (oil or a gas) and the compressed air for forming the combustible gas passes into the combustion-chamber B by means of a pipe G, which extends up through the bottom of the casing A, as is plainly shown in the drawings, the upper end of said pipe G being normally closed by a ball-valve H, held within a perforated nozzle I, through which the liquid fuel and compressed air pass, minutely divided, into the combustion-chamber B to form a combustible gas to be burned in the said chamber.

The upper end of the pipe G and its nozzle I are inclosed within a tube J, extending upwardly from the bottom of the casing A to within a short distance of the top of the combustion-chamber B, and in this tube J, and near the lower end thereof, is formed a port J' to permit the condensing liquid D under normal conditions to stand at the same level in the tube J as in the chambers B and C.

The liquid fuel passes into the pipe G at the outside of the casing A through a pipe K, leading from the bottom of a jacket A', formed on the casing A and connected by an oil-supply pipe K' with an overhead tank containing the oil or similar liquid fuel. A pipe K² connects the tank with the pipe G, so that the same pressure is maintained in the tank and pipe G to insure a gravity flow of the oil through the jacket A' and pipe K to the pipe G. As the casing A is heated to a considerable extent, the liquid fuel in passing through the jacket A' will be vaporized and pass in this state to the pipe G. The lower end of the latter is connected by a pipe L with a second jacket A², arranged on the casing A on the opposite side to that on which the jacket A' is located. The upper end of this jacket A² is connected by a pipe L' with an air-compressor or other suitable source of compressed-air supply.

Into the casing A discharges a water-supply pipe N, as indicated in the drawings, and this pipe N connects with an overhead water-supply in which a pressure is maintained equal to the pressure in the chamber C by means of a pipe N', leading from said chamber to the said water-supply tank. By the arrangement described the water as well as the oil is fed by gravitation.

Adjacent to the combustion-chamber B is arranged an igniting-chamber O, adapted to connect by a passage O' with said combustion-chamber, the passage being normally closed by a valve P, having its stem P' fitted to slide in the casing A, the valve-stem being pressed on by a spring $P^2$, so as to hold said valve P normally to its seat. Within the igniting-chamber O are arranged two electrodes Q, supported in a block R, of glass or other suitable insulating material, the electrodes being connected with a suitable source of electricity to insure a spark between the inner ends of the electrodes whenever desired. A small discharge or vent port $O^2$ leads from the chamber O to the outside to permit the products of combustion to escape from said chamber O after the valve P is closed, as hereinafter more fully described.

The operation is as follows: In starting the apparatus the casing A is filled with a sufficient quantity of a condensing liquid D, preferably hot water, and then communication is made between the source of compressed air and the chamber B by opening a valve in the pipe L'. The compressed air passes from the chamber B by way of the condensing liquid to the chamber C to equalize and continue the pressure in both chambers. The motor is now started by opening a valve in the supply-pipe F to establish communication between the motor and motive vapor-chamber C, and when the motor is working then the liquid fuel or gas is turned on to cause a mixture of the compressed air with the vaporized gas and form an inflammable and combustible gas which can be ignited at any time while the motor is running by opening the valve P to permit an ignition of the gas by the spark in the igniting-chamber O. The valve P closes on the ignition of the charge in the combustion-chamber B and the gaseous products of combustion pass downwardly in the chamber B and then upwardly through the condensing liquid D to finally rise and pass into the vapor-chamber C. The motive agent thus produced passes from the vapor-chamber C by the pipe F to the motor to drive the same. The stoppage of the motor stops the combustion by stopping the supply of compressed air. To resume operations, it is only necessary to start the motor and then ignite the gas. At all times the motor must be working before ignition can take place.

By the arrangement described the burning of the combustible charge takes place in a closed chamber and above the level and in the presence of the entire level of the condensing liquid in the combustion-chamber, and the gaseous products of combustion, in order to reach the vapor-chamber, must pass downward in the chamber B and then upward through the liquid D to the chamber C. It is understood that the condensing liquid forms, with the side wall B' of the combustion-chamber, a liquid seal for the latter and a large area of level of the condensing liquid is present when the combustible charge is burning, and the gaseous products, under ordinary pressure in the combustion and vapor chambers, pass into and through the liquid without disturbing the level of the liquid in the chamber C to a great extent, and the columns of liquid are made long enough to allow of a rise or fall to counterbalance any variation of pressure that can occur in the chambers and to assure the condensing liquid being ever present in the combustion-chamber.

The area of the motor-supply pipe F is considerably less than the area of the condensing liquid in either chamber B or C, so that the products of combustion in chamber B are given ample area to reach the vapor-chamber C slowly. Therefore the velocity of the motive agent passing through the pipe F to the motor is relatively higher than the velocity of the products of combustion through the condensing liquid. Thus by giving the products of combustion more time while passing from the chamber B through the condensing liquid for reaching the chamber C and the pipe F it is evident that a more perfect mixing, combustion, and cleansing of the gases is obtained.

Now it will be seen that by this method of combustion and condensation heat units in the liquid fuel are utilized to a maximum degree, as the hot products of combustion have to travel downward in the chamber B and then upward through the condensing liquid to reach the chamber C, and they are given sufficient time and space for perfect combustion and a large area of condensing liquid in which to condense and cleanse themselves.

The fluid forming the motive agent and produced in the manner described and passed to the motor by pipe F is approximately of the same volume as the compressed air originally passed into the chamber B, but its heat units and its moisture are increased to a considerable extent at the comparatively low expense of a small amount of oil or gas used for the heating.

It will further be seen that having the igniting-chamber O separated from the combustion-chamber B the electrodes are protected from hurtful effects of the flame, and short-circuiting the said electrodes by possible moisture in the gas to be ignited is entirely prevented. It is understood that the spark is first produced between the electrodes and then the valve P is opened for a time sufficient to permit ignition of the gas by the spark. The burned gas in the chamber O can readily pass through the vent-opening $O^2$ to the outside, and the chamber O is a normally pressureless, isolated, dry chamber and permits of igniting moist inflammable gas brought in contact with the spark between the electrodes $Q^3$, connected with an ordinary electric battery. If moist gas is in constant contact with the electrodes, the latter will not spark, but producing the spark first then the latter will readily ignite the moist gas.

It will be understood that the isolating of the electrodes and creating the spark in a dry, separate, and normally pressureless chamber and then bringing the gas in contact with the spark is a valuable feature of my invention.

In the apparatus shown in Fig. 2 the jackets of the casing $A^3$, as well as the tube $J$, are entirely dispensed with, and the nozzle $I'$ of the pipe $G'$ and containing the ball-valve $K'$ extends into the combustion-chamber $B^2$ above the level of the liquid $D'$ contained in the casing $A^3$ and defining the bottom for the combustion-chamber $B^2$ and the vapor-chamber $C'$. From the latter leads a pipe $F'$ to the motor for carrying off the motive agent. The casing is provided in its bottom with a water-supply pipe $N^2$ and at its top with a pressure-pipe $N^3$, leading to the tank containing the water-supply. The oil-supply pipe $K^3$ leads into the pipe $G'$, supporting the nozzle $I'$ and valve $K'$, and from the pipe $G'$ leads the pipe $K^4$ to the oil-tank for equalizing the pressure therein. An air-supply pipe $L^2$ connects with the lower end of the pipe $G'$, as shown. The igniting-chamber $O^3$ is adapted to be connected with the combustion-chamber $B^2$ by a cock $P^3$, adapted to be turned, so as to establish communication between the chambers $O^3$ and $B^2$ whenever it is desired to ignite the gaseous combustible charge contained in the chamber $B^2$. The electrodes $Q'$ are held in insulated blocks $R'$ and are connected with a suitable source of electricity to form a spark in the chamber $O^3$ for igniting the gas. A vent-cock $O^4$ is connected with the chamber $O^3$ to carry off the burned gases remaining in said chamber when the cock $P^3$ is shut. The operation is the same as previously described in reference to Fig. 1.

The apparatus shown in Fig. 3 is provided with a combustion-chamber comprising two chambers $B^3$ and $B^4$, connected with each other by a pipe $B^5$, as small as practicable for the work to be done by the motor, the chamber $B^3$ receiving the charge and the chamber $B^4$ having its bottom defined by the level of the condensing liquid $D^2$, contained in the casing $A^4$, so that the charge ignited in the chamber $B^3$ burns in both chambers $B^3$ and $B^4$ and the pipe $B^5$ and the gaseous products of combustion pass through the liquid $D^2$ to reach the vapor-chamber $C^2$. The vapor-chamber $C^2$ is provided with a pipe $F^2$ for carrying off the motive agent to the motor, and the supply-pipe $N^4$ for the condensing liquid leads into said chamber, and a pipe $N^5$ leads therefrom to the tank containing the condensing liquid to equalize the pressure in the tank and the chamber $C^2$ and insure a gravity flow of the condensing liquid. The charge of oil and compressed air passes through the pipe $G^2$ into an annular chamber $B^7$, formed in the chamber $B^3$, said annular chamber $B^7$ being connected by a series of apertures $B^8$ with the interior of the chamber $B^3$, so that the mixture passes through said apertures $B^8$ in a finely-divided state to the chamber $B^3$. By this arrangement the separate nozzle $I$ (shown in Figs. 1 and 2) can be dispensed with. The pipe $G^2$ is connected with an air-supply pipe $L^3$ and with an oil-supply pipe $K^5$, and from the said pipe $G^2$ leads a pressure-pipe $K^6$ to the oil-tank to equalize the pressure therein. The igniting-chamber $O^5$ is here formed in an insulated block $R^3$, as is plainly shown in the drawings, and the electrodes $Q^2$ are held in the block $R^3$ (which may be in two parts) and are connected with a suitable source of electricity, and said block $R^3$ is secured in the shell of an ordinary one-way cock $P^4$, adapted to be turned like an ordinary one-way cock, to open or close the igniting-chamber $O^5$ to the combustion-chamber $B^3$. Now it will be seen that the gas in the chambers $B^3$ $B^4$ and pipe $B^5$ will be ignited by the spark from the electrodes $Q^2$ in the ignition-chamber $O^5$ when the cock $P^4$ is turned open to the combustion-chamber $B^3$. The cock is shut as soon as ignition occurs and burned gas in the ignition-chamber escapes by the vent-hole $O^7$. The gaseous products of combustion pass by the pipe $B^5$ into the chamber $B^4$, from which the gaseous products pass through the liquid $D^2$ to the vapor-chamber $C^2$. Thus the action of the gaseous products relative to the condensing liquid $D^2$ is exactly the same as above described in reference to Figs. 1 and 2.

It is understood that one of the principal features of my invention consists in burning the gas in the presence of a large body of condensing liquid and passing the gaseous products of the combustion under pressure first downwardly in the chamber $B$ and then upwardly through the condensing sealing liquid to a vapor-chamber without permanent or serious displacement of said sealing liquid.

It is further understood that the igniting device for the ignition of the charge in the combustion-chamber forms a very important feature of my invention, as the said device can be readily manipulated whenever it is desired to start the combustion.

It is understood that each apparatus is provided with the usual safety-valve, pressure-gage, water-gage, stop-valve, blow-off, scum-cocks, and other mountings usually fitted to an ordinary steam-boiler. It is preferable to have two valves on the oil-supply pipes and the water-supply pipe, one valve to be used as a regulator for the liquid passing through the pipe and the other for completely turning the supply on or off.

Having thus fully described my invention, I claim as new and desire to secure by Letters Patent—

1. An apparatus of the class described, comprising a casing adapted to contain the condensing liquid, a tube extending into the condensing liquid to form a combustion-chamber within the tube and a vapor-chamber around the tube, the bottoms of both chambers being formed by the condensing liquid, means for supplying the said combustion-chamber with a combustible gas, and an igniting device for the said gas in the combustion-chamber, the products of combustion passing through the liquid to reach the said vapor-chamber, substantially as shown and described.

2. An apparatus of the class described, comprising a closed casing adapted to contain the condensing liquid, a tube extending into the said casing and into the liquid contained therein to form a combustion-chamber within the tube and a vapor-chamber around the tube, both chambers having their bottoms formed by the said condensing liquid, a nozzle for supplying the air and fuel to the said combustion-chamber, air and fuel pipes for the said nozzle, and an igniting-chamber having a valved connection with the said combustion-chamber, substantially as shown and described.

3. An apparatus of the class described, provided with a combustion-chamber and a vapor-chamber, both chambers having their bottoms in free communication with the condensing liquid extending into the said chambers, a valved igniting-chamber connected with the top of the combustion-chamber, electrodes in the said igniting-chamber and adapted to spark and ignite the moist gas admitted into the igniting-chamber through the valved connection, the products of combustion passing through the liquid, to reach the said vapor-chamber, and an outlet-pipe for the said vapor-chamber, to connect with the motor, substantially as shown and described.

4. An apparatus of the class described, comprising a casing, a tube extending from the bottom of the said casing upwardly nearly to its top, a second tube extending from the top of the casing down, over and below the upper end of the said first tube forming a combustion-chamber, an ignition-chamber connected with the said combustion-chamber, a nozzle arranged within the tube leading from the bottom of the casing, and air and fuel supply pipes in connection with the said nozzle, substantially as shown and described.

5. An apparatus of the class described, comprising a casing inclosing a combustion-chamber and provided with a jacket for the oil or fuel and with a jacket for the compressed air, supply-pipes leading to the said jackets, a nozzle by which to deliver the air and fuel to the combustion-chamber, and connections between the said nozzle and the air and fuel jackets, substantially as shown and described.

JOHN McINTYRE.

Witnesses:
THEO. G. HOSTER,
JNO. M. RITTER.